(12) United States Patent
Asajima et al.

(10) Patent No.: US 10,944,899 B2
(45) Date of Patent: Mar. 9, 2021

(54) IMAGE PROCESSING DEVICE AND IMAGE PROCESSING METHOD

(71) Applicant: SONY CORPORATION, Tokyo (JP)

(72) Inventors: Shuichi Asajima, Tokyo (JP); Akira Tokuse, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/486,597

(22) PCT Filed: Jan. 30, 2018

(86) PCT No.: PCT/JP2018/002813
§ 371 (c)(1),
(2) Date: Aug. 16, 2019

(87) PCT Pub. No.: WO2018/168228
PCT Pub. Date: Sep. 20, 2018

(65) Prior Publication Data
US 2019/0394394 A1    Dec. 26, 2019

(30) Foreign Application Priority Data

Mar. 15, 2017  (JP) ................................. 2017-049721

(51) Int. Cl.
*H04N 5/232* (2006.01)
*G06T 7/571* (2017.01)

(52) U.S. Cl.
CPC ......... *H04N 5/23222* (2013.01); *G06T 7/571* (2017.01); *H04N 5/23245* (2013.01); *G06T 2207/10016* (2013.01)

(58) Field of Classification Search
CPC .................................................. H04N 5/23222
USPC ...................................................... 348/222.1
See application file for complete search history.

(56) References Cited

U.S. PATENT DOCUMENTS

2013/0038700 A1* 2/2013 Horita .................. G02B 7/36
348/47

FOREIGN PATENT DOCUMENTS

| EP | 2563022 A1 | 2/2013 |
| JP | 2004-315927 A | 11/2004 |
| JP | 2011-047883 A | 3/2011 |
| JP | 2012-133194 A | 7/2012 |
| WO | 2011/132552 A1 | 10/2011 |

OTHER PUBLICATIONS

International Search Report and Written Opinion of PCT Application No. PCT/JP2018/002813, dated Apr. 3, 2018, 11 pages of ISRWO.

* cited by examiner

*Primary Examiner* — Joel W Fosselman
(74) *Attorney, Agent, or Firm* — Chip Law Group

(57) ABSTRACT

An image processing device uses a first image captured by a first lens with an unknown focal length and a second image captured by a second lens with a known focal length to calculate the focal length of the first lens.

24 Claims, 12 Drawing Sheets

PYRAMID IMAGE (FIRST IMAGE)

EFFECTIVE PIXEL REGION

SECOND IMAGE

EFFECTIVE PIXEL REGION
CORRESPONDING TO PYRAMID IMAGE

IMAGE PROCESSING DEVICE AND IMAGE PROCESSING METHOD

CROSS REFERENCE TO RELATED APPLICATIONS

This application is a U.S. National Phase of International Patent Application No. PCT/JP2018/002813 filed on Jan. 30, 2018, which claims priority benefit of Japanese Patent Application No. JP 2017-049721 filed in the Japan Patent Office on Mar. 15, 2017. Each of the above-referenced applications is hereby incorporated herein by reference in its entirety.

TECHNICAL FIELD

The present technology relates to an image processing device, an image processing method, and an image processing program.

BACKGROUND ART

A digital single-lens reflex camera or the like can perform imaging with a separate lens mounted on a camera body. In such an interchangeable lens camera, focal length information is recorded as tag information in a lens, and the focal length information of the lens is transmitted to the camera body so that the camera body can perform various processings such as camera shake correction using the focal length information. However, when imaging is performed by mounting, on the camera body, a so-called old lens without electronic tag information recorded therein or without a communication function with the camera body, a user needs to input focal length information of the old lens directly to the camera body, and it is very inconvenient to repeat this operation every time the lens is replaced.

As a solution to this problem, there is a method that uses two images captured in succession (Patent Document 1). The method is to perform matching between the two images and back calculate the focal length from an optical flow of the images. (Patent Document 1).

CITATION LIST

Patent Document

Patent Document 1: Japanese Patent Application Laid-Open No. 2004-315927

SUMMARY OF THE INVENTION

Problems to be Solved by the Invention

However, since the method is the image-based matching, the matching is not performed accurately if a subject moves, and there is also a restriction that a camera parameter such as zoom cannot be changed during imaging. Furthermore, if movement in a depth direction occurs at the time of imaging, images having different scales are to be matched, which causes a problem that high calculation power is required to perform the matching accurately.

The present technology has been made in view of such problems, and an object thereof is to provide an image processing device, an image processing method, and an image processing program capable of obtaining a focal length of a lens whose focal length is unknown.

Solutions to Problems

In order to solve the above problems, a first technology is an image processing device that uses a first image captured by a first lens with an unknown focal length and a second image captured by a second lens with a known focal length to calculate the focal length of the first lens.

Furthermore, a second technology is an image processing method that uses a first image captured by a first lens with an unknown focal length and a second image captured by a second lens with a known focal length to calculate the focal length of the first lens.

Moreover, a third technology is an image processing program that causes a computer to execute an image processing method that uses a first image captured by a first lens with an unknown focal length and a second image captured by a second lens with a known focal length to calculate the focal length of the first lens.

Effects of the Invention

According to the present technology, the focal length of the lens whose focal length is unknown can be obtained. Note that the present technology has an effect not necessarily limited to the one described herein, but may have any effect described in the specification.

MODES FOR CARRYING OUT THE INVENTION

Embodiments of the present technology will now be described with reference to the drawings. Note that the description will be made in the following order.
<1. First Embodiment>
[1-1. Configurations of image processing device and imaging apparatus]
[1-2. Focal length calculation processing]
<2. Second Embodiment>
[2-1. Focal length calculation processing]
<3. User interface>
<4. Variation>

1. First Embodiment

[1-1. Configurations of Image Processing Device and Imaging Apparatus]

Figure 1:
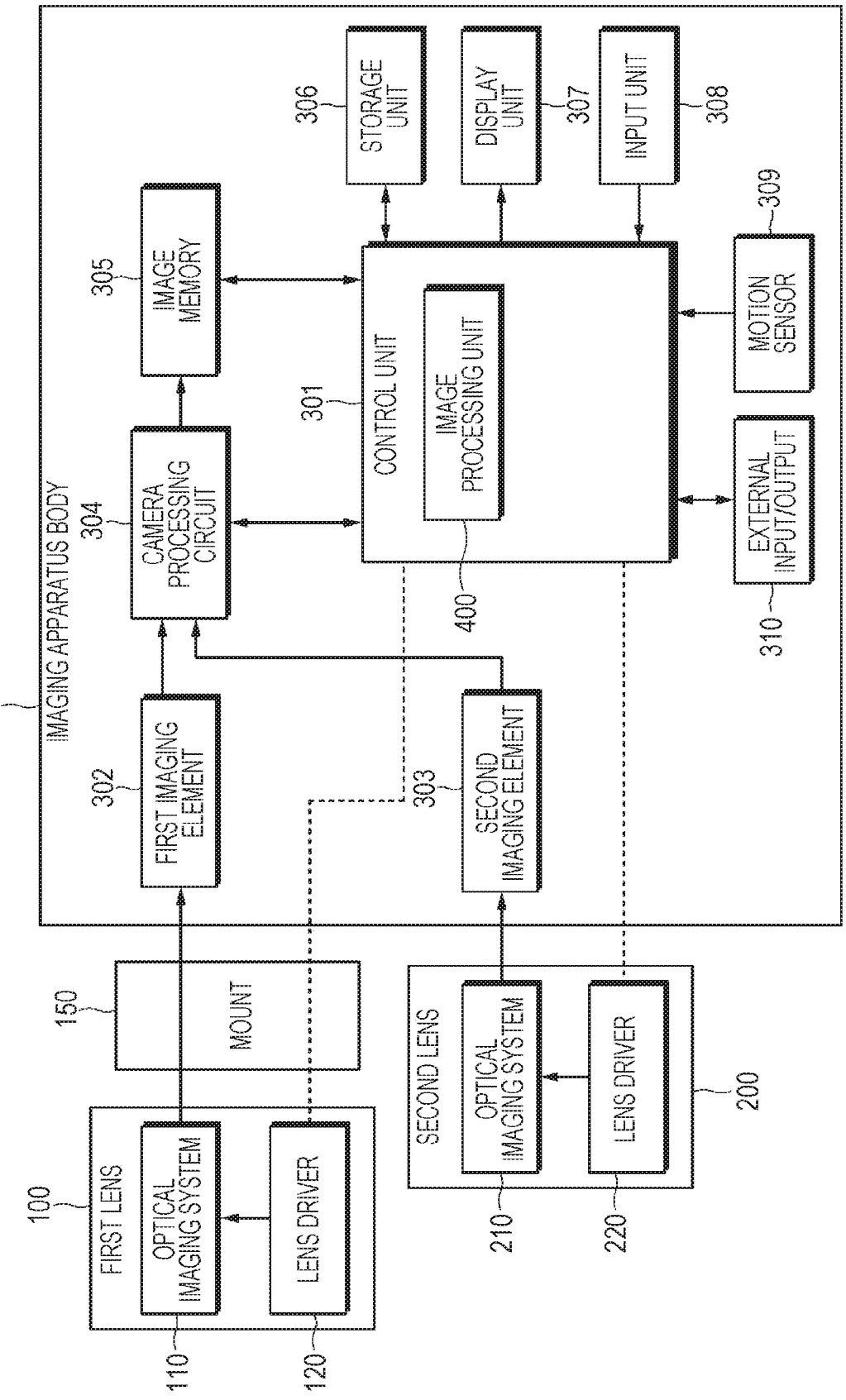
FIG. 1 is a block diagram illustrating configurations of an image processing device and an imaging apparatus according to the present technology.

First, a configuration of an imaging apparatus 500 having a function of an image processing device according to a first embodiment will be described. FIG. 1 is a block diagram illustrating configurations of an image processing unit 400 as the image processing device and the imaging apparatus 500. The imaging apparatus 500 includes a first lens 100, a mount 150, a second lens 200, and an imaging apparatus body 300.

The first lens 100 is a so-called interchangeable lens that can be mounted on the imaging apparatus body 300, and includes an optical imaging system 110 and a lens driver 120 in a lens barrel (not shown). The first lens 100 is mounted on the imaging apparatus body 300 through the mount 150. The first lens 100 functions as a main lens in the imaging apparatus 500.

The optical imaging system 110 includes an imaging lens for focusing light from a subject on an imaging element, a drive mechanism for moving the imaging lens to perform focusing and zooming, a shutter mechanism, an iris mechanism, and the like. These are driven on the basis of a control signal from a control unit 301 of the imaging apparatus body 300 and the lens driver 120. An optical image of a subject obtained through the optical imaging system 110 is formed on a first imaging element 302 included in the imaging apparatus body 300.

The lens driver 120 includes a microcomputer or the like, for example, and moves the imaging lens by a predetermined amount along a direction of an optical axis under control of the control unit 301 of the imaging apparatus body 300, thereby performing auto focus to achieve focus on a target subject. Furthermore, under control of the control unit 301, the lens driver controls the operation of the drive mechanism, the shutter mechanism, the iris mechanism, and the like of the optical imaging system 110. As a result, an exposure time (shutter speed), an aperture value (F value), and the like are adjusted.

The first lens 100 has an unknown focal length. Moreover, the first lens 100 does not have a function of transmitting and receiving information to and from the imaging apparatus body 300. Therefore, the first lens 100 is one such that the imaging apparatus body 300 cannot obtain focal length information of the first lens 100. The present technology performs image processing to calculate the focal length of the first lens 100 being the interchangeable lens whose focal length is unknown. The focal length is a distance from the lens to the imaging element when in focus. Depending on the lenses, the focal length is a fixed value or has a range such as "18 mm to 55 mm" by the motion of the lens in a direction parallel to the optical axis.

The second lens 200 is formed integrally with the imaging apparatus body 300, and includes an optical imaging system 210 and a lens driver 220. The configurations of the optical imaging system 210 and the lens driver 220 are similar to those included in the first lens 100. An optical image of a subject obtained by the second lens 200 is formed on a second imaging element 303 included in the imaging apparatus body 300. The second lens 200 functions as a sub lens in the imaging apparatus 500.

The second lens 200 has a known focal length on condition that the imaging apparatus body 300 can obtain focal length information of the second lens 200.

The imaging apparatus body 300 includes the control unit 301, the first imaging element 302, the second imaging element 303, a camera processing circuit 304, an image memory 305, a storage unit 306, a display unit 307, an input unit 308, a motion sensor 309, external input/output 310, and the image processing unit 400.

The control unit 301 includes a central processing unit (CPU), a random access memory (RAM), a read only memory (ROM), and the like. The ROM stores a program to be read and operated by the CPU and the like. The RAM is used as a work memory of the CPU. The CPU controls the entire imaging apparatus 500 by executing various processings in accordance with the program stored in the ROM and issuing a command.

The first imaging element 302 photoelectrically converts incident light from a subject into electric charge and outputs a pixel signal. Then, the first imaging element 302 outputs the pixel signal to the camera processing circuit 304. A charge coupled device (CCD), a complementary metal oxide semiconductor (CMOS), or the like is used as the first imaging element 302.

The second imaging element 303 has a similar configuration to the first imaging element 302. An optical image of a subject obtained by the first lens 100 is formed on the first imaging element 302, and an optical image of the subject obtained by the second lens 200 is formed on the second imaging element 303. In the following description, an image captured by the first lens 100 is referred to as a first image, and an image captured by the second lens 200 is referred to as a second image. The first image and the second image are images captured at the same timing in response to an imaging instruction such as depression of a release button by a user. Furthermore, the first image and the second image are images captured to include the same subject.

The camera processing circuit 304 performs sample and hold for maintaining a favorable signal/noise (S/N) ratio by correlated double sampling (CDS) processing, auto gain control (AGC) processing, analog/digital (A/D) conversion, or the like on an imaging signal output from the imaging element, and generates an image signal.

The camera processing circuit 304 may also perform predetermined signal processings on the image signal such as demosaicing, white balance adjustment processing, color correction processing, gamma correction processing, Y/C conversion processing, auto exposure (AE) processing, resolution conversion processing, or the like.

The image memory 305 is a buffer memory including a volatile memory such as a dynamic random access memory (DRAM). An image memory 305 temporarily stores image data subjected to predetermined processing by the camera processing circuit 304.

The storage unit 306 is a mass storage medium such as a hard disk, an SD memory card, or the like, for example. An image is saved while being compressed in accordance with a standard such as Joint Photographic Experts Group (JPEG), for example. Moreover, Exchangeable Image File Format (EXIF) data including information related to the image saved and additional information such as imaging date and time is also saved in association with the image. A moving image is saved in a format such as Moving Picture Experts Group 2 (MPEG2), MPEG4, or the like, for example. In addition, the focal length information of the first lens 100 calculated by the present technology can also be saved as EXIF information.

The display unit 307 is a display device including, for example, a liquid crystal display (LCD), a plasma display panel (PDP), an organic electro luminescence (EL) panel, or the like. The display unit 307 displays a user interface of the imaging apparatus 500, a menu screen, a monitoring image during imaging, a captured image recorded in the storage unit 306, a shot moving image, and the like.

The input unit 308 is used to input an imaging instruction, various settings, and the like to the imaging apparatus body 300. When a user makes an input to the input unit 308, a control signal corresponding to the input is generated and output to the control unit 301. Then, the control unit 301 performs arithmetic processing and control of the imaging apparatus 500 corresponding to the control signal. The input unit 308 includes hardware buttons such as a release button, an imaging start instruction button, a power button for switching on/off a power supply, and a manipulator for zoom adjustment as well as a touch panel formed integrally with the display unit 307 and the like.

The motion sensor 309 detects a motion of the imaging apparatus 500 using, for example, an acceleration sensor, an angular velocity sensor, a gyro sensor, or the like corresponding to two or three axis direction to detect the speed and direction of movement of the imaging apparatus 500 itself as well as the speed (angular velocity) at which the angle of rotation changes and the angular velocity around the Y-axis direction when the imaging apparatus 500 turns, thereby outputting the detected results to the control unit 301 and the image processing unit 400.

The external input/output 310 includes various communication terminals such as a universal serial bus (USB), a module, and the like for the imaging apparatus body 300 to transmit/receive various data such as image data to/from an external device (a personal computer, a tablet terminal, a smart phone, and the like). The transmission and reception of data between the imaging apparatus body 300 and the external device may be performed not only via wired communication but via wireless communication such as a wireless local area network (LAN) including Wi-Fi, Bluetooth, ZigBee, or the like.

The image processing unit 400 receives the first image captured by the first lens 100 and the second image captured by the second lens 200. The image processing unit 400 calculates the focal length of the first lens 100 by performing predetermined processing on the first image and the second image. Details of focal length calculation processing by the image processing unit 400 will be described later.

The image processing unit 400 is configured as a program, and the program may be installed in advance to the imaging apparatus body 300 or may be distributed by downloading, a storage medium, or the like to be installed by a user himself. The control unit 301 may function as the image processing unit 400 by executing the program. Furthermore, the image processing unit 400 may be implemented not only by the program but by a combination of a dedicated device, a circuit, and the like by hardware having the function.

The image processing unit 400 as the image processing device and the imaging apparatus 500 are configured as described above.

[1-2. Focal Length Calculation Processing]

Figure 2:
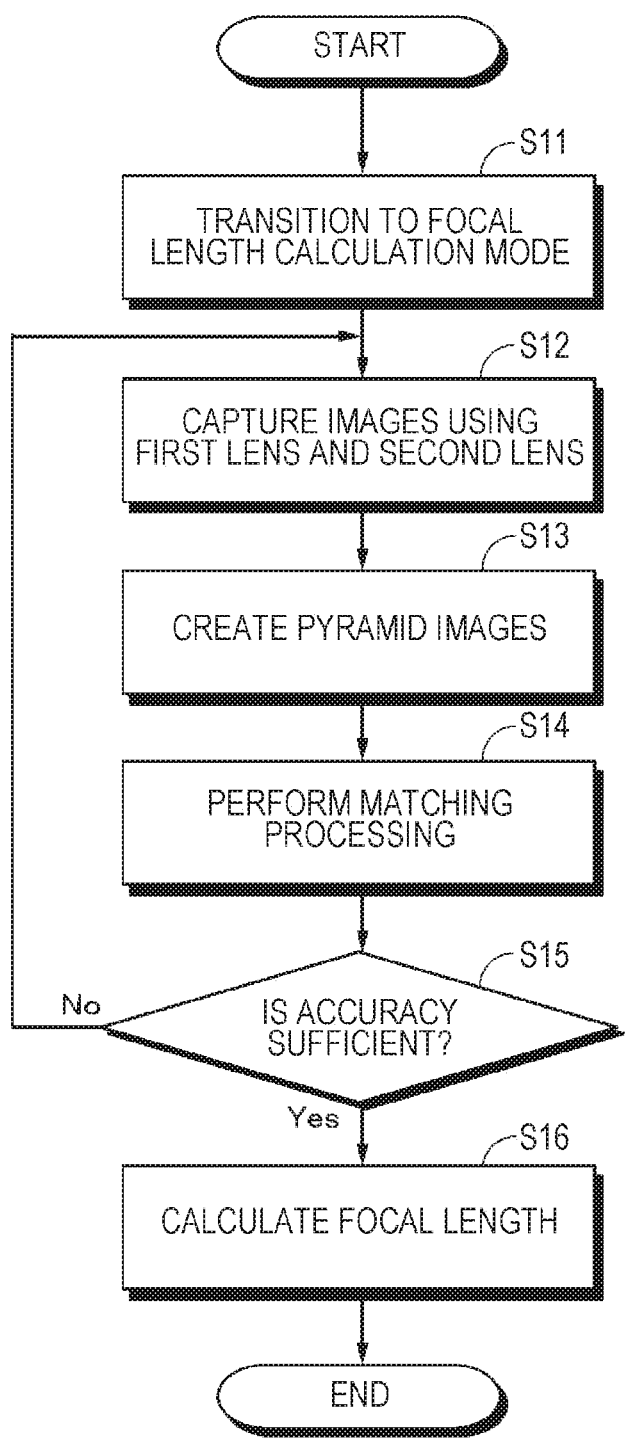
FIG. 2 is a flowchart illustrating a flow of focal length calculation processing according to a first embodiment.

Next, the focal length calculation processing by the image processing unit 400 will be described with reference to FIG. 2. FIG. 2 is a flowchart illustrating a flow of the focal length calculation processing. Note that the first lens 100 is mounted on the imaging apparatus body 300 prior to the focal length calculation processing. In order to perform the focal length calculation processing, a user needs to perform imaging (referred to as provisional imaging) for calculating the focal length before performing imaging (referred to as main imaging) of a desired subject with the imaging apparatus 500. The focal length calculation processing is performed in the provisional imaging.

First, in step S11, the imaging apparatus 500 transitions to a focal length calculation mode. This is performed, for example, in response to an input instructing the transition to the focal length calculation mode to the input unit 308 from a user. Upon transitioning to the focal length calculation mode, the imaging apparatus 500 enters a state of performing the provisional imaging.

Next, in step S12, in response to an imaging instruction such as depression of the release button from a user, the imaging apparatus 500 captures an image. In this step S12, both the first image obtained by the first lens 100 and the first imaging element 302 and the second image obtained by the second lens 200 and the second imaging element 303 are captured. The first image and the second image captured by the imaging are supplied to the image processing unit 400.

Figure 3:
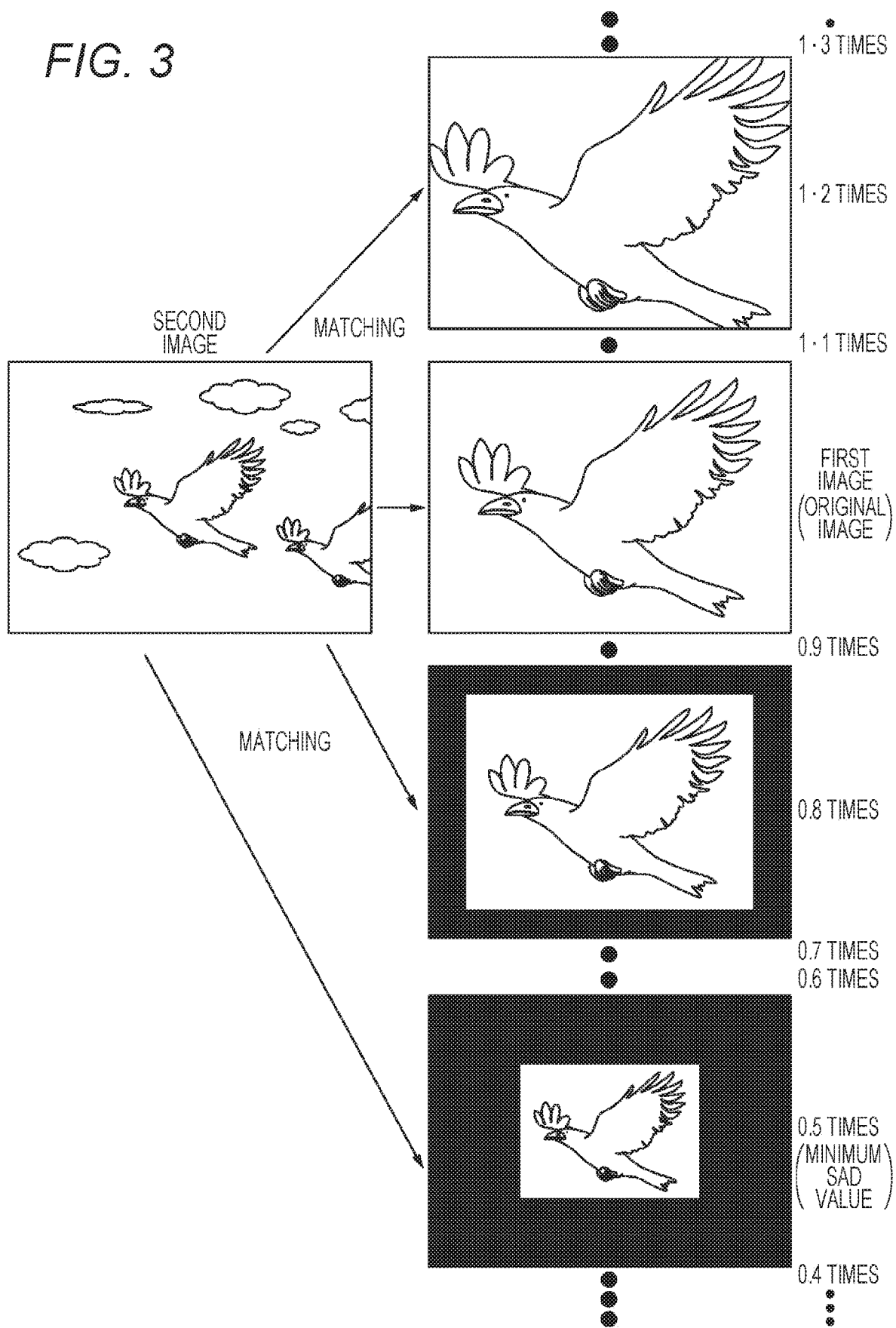
FIG. 3 is a diagram for explaining creation of pyramid images.

Next, in step S13, the image processing unit 400 creates pyramid images. The creation of the pyramid images is, as illustrated in FIG. 3, the processing of creating an image group including a series of enlarged images and reduced images obtained by changing the magnification (reduction ratio and enlargement ratio) of the first image in fixed increments. The creation of the pyramid images is performed by reducing or enlarging the length and width with the same magnification while setting the center of the first image as the origin. Moreover, the size of the pyramid image is the same as that of the first image which is an original image, and a blank region generated by reduction is filled with an arbitrary value. In the example of FIG. 3, a plurality of the pyramid images is created with the reduction ratio and the enlargement ratio changed in increments of 0.1.

Next, in step S14, the image processing unit 400 performs matching processing between each of the plurality of pyramid images and the second image. This matching processing calculates a sum of absolute difference (SAD) value for each of the pyramid images by matching each of the pyramid images created in step S13 with the second image, as illustrated in FIG. 3. Details of the matching processing will be described later.

Next, in step S15, the image processing unit 400 determines whether a result of the matching processing performed in step S14 has sufficient accuracy to calculate the focal length of the first lens 100. Details of accuracy determination processing will be described later. In a case where it is determined in step S15 that the result of the matching processing does not have sufficient accuracy to calculate the focal length, the processing proceeds to step S12 (No in step S15). Then, in response to an imaging instruction such as depression of the release button from a user, the imaging apparatus 500 captures the first image and the second image again. This processing is repeated until it is determined in step S15 that the result of the matching processing has sufficient accuracy to calculate the focal length.

In a case where the result of the matching has sufficient accuracy to calculate the focal length, the processing proceeds to step S16 (Yes in step S15). Then, in step S16, the focal length of the first lens 100 is calculated. The focal length of the first lens 100 is calculated from the magnification of the pyramid image with the smallest SAD value calculated in the matching and the focal length of a second camera using the following expression (1).

[Expression 1]

Focal length $F1$ of first lens 100=focal length $F2$ of second lens 200/magnification of pyramid image with smallest SAD value    (1)

Assuming that the focal length of the second lens 200 is 20 mm, the pyramid image with the magnification of 0.5 has the smallest the SAD value in the example of FIG. 3 so that, from the magnification of 0.5 and the focal length of 20 mm of the second lens 200, the focal length F1 of the first lens 100 is calculated as "F1=20/0.5=40 mm". The focal length of the first lens 100 is calculated in this manner.

Figure 4:
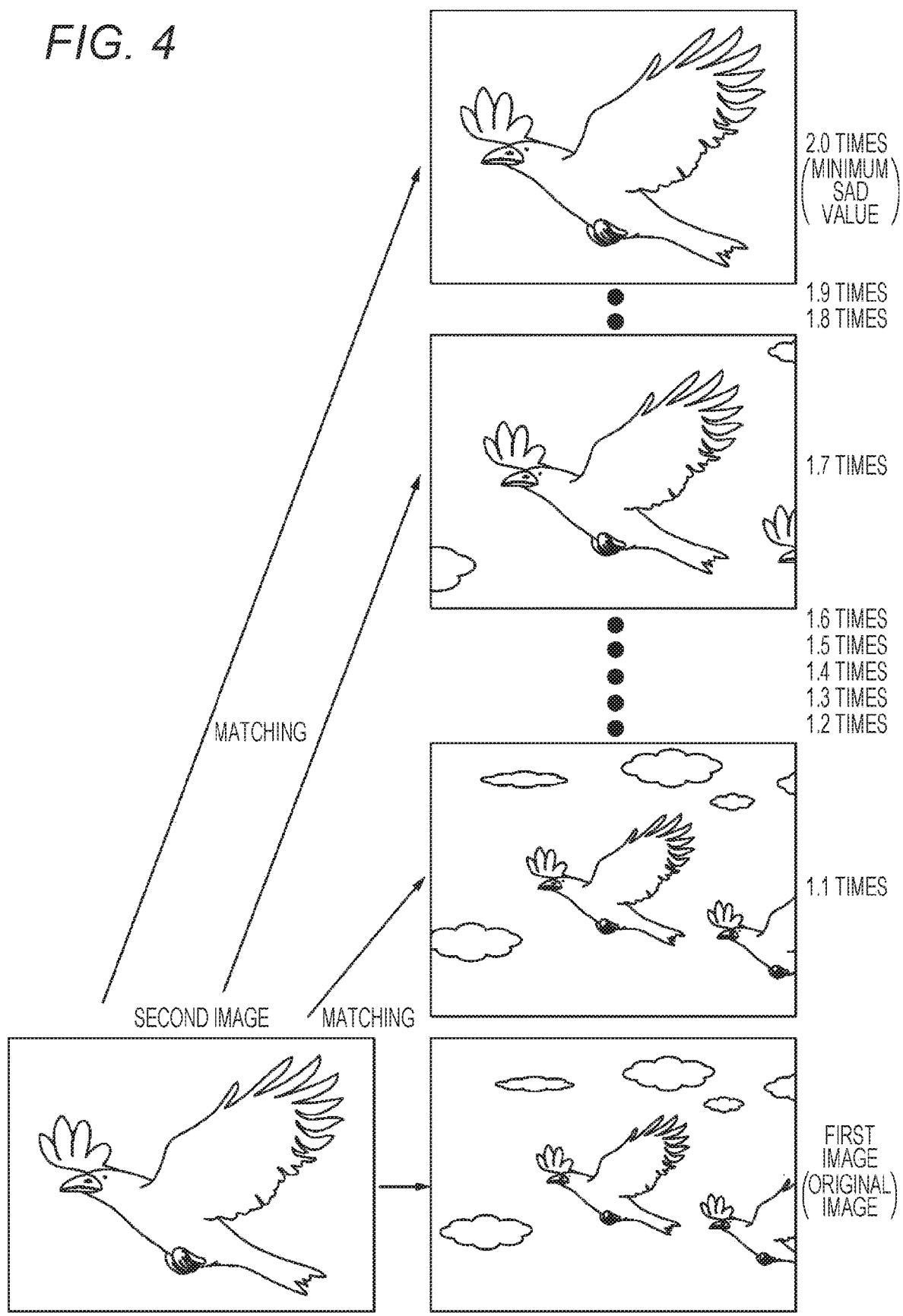
FIG. 4 is a diagram for explaining creation of the pyramid images.

Note that the SAD value is minimized with the magnification of the pyramid image of 1.0 or lower as illustrated in FIG. 3 typically in a case where the first lens 100 is a telephoto lens. On the other hand, the SAD value is minimized with the magnification of the pyramid image of 1.0 or higher as illustrated in FIG. 4 typically in a case where the second lens 200 is a telephoto lens.

Figure 5:
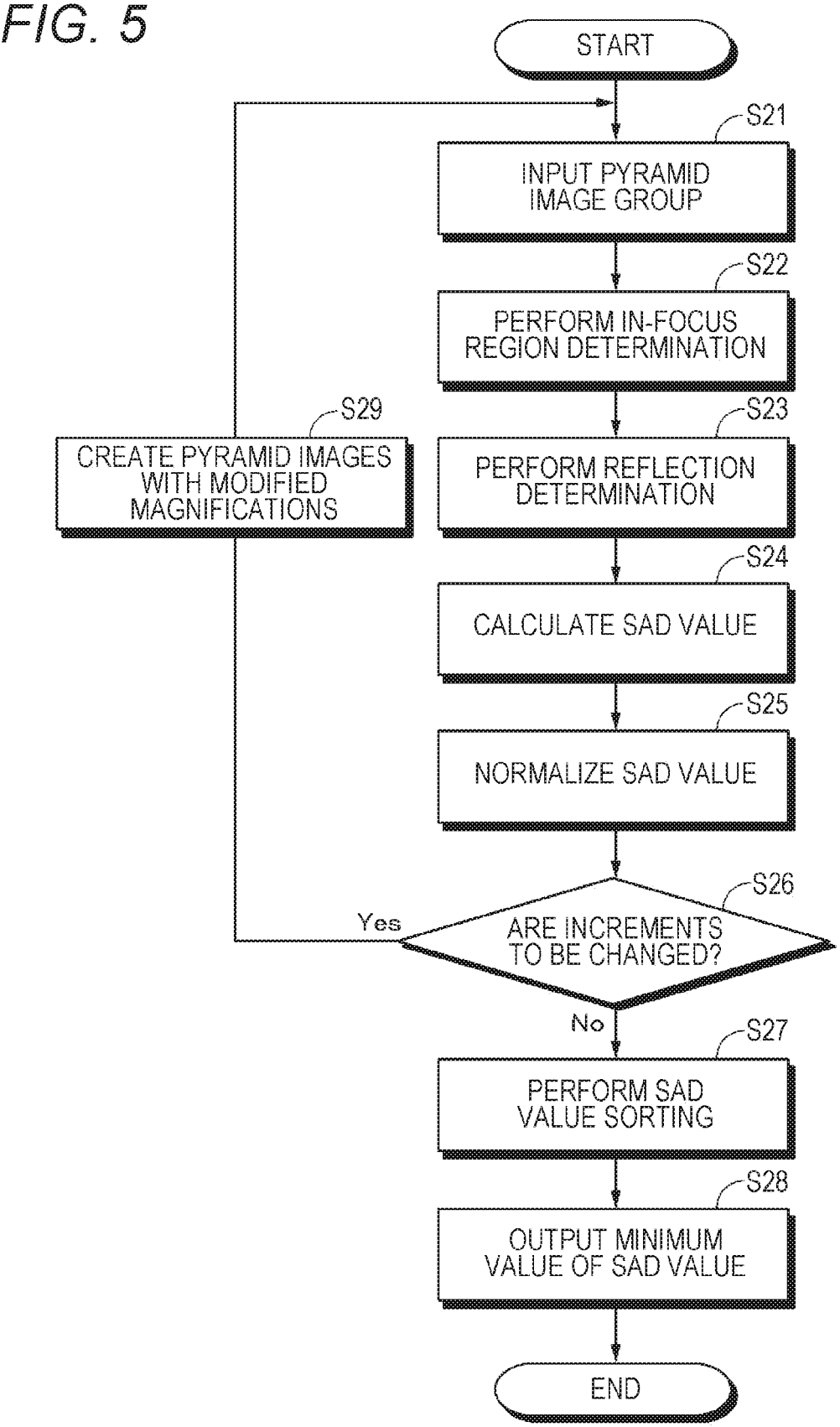
FIG. 5 is a flowchart illustrating a flow of matching processing.

Here, the matching processing will be described with reference to a flowchart of FIG. 5.

First, in step S21, the plurality of the pyramid images created in step S13 of the flowchart in FIG. 2 is input as targets for the matching processing. Note that the matching processing uses only an effective region (a region excluding the blank region) of the pyramid image in a case of the pyramid image obtained by reducing the first image, or uses the entire image in a case of the pyramid image obtained by enlarging the first image.

In a case where the first imaging element 302 and the second imaging element 303 have different imager sizes, images captured thereby also have different blurriness so that the matching accuracy is reduced. In order to avoid this, phase difference information between the first imaging element 302 and the second imaging element 303 may be used to extract a region in focus and perform matching using only that region.

Next, in step S22, in-focus region determination is performed. This is to determine whether an in-focus region in each pyramid image has a predetermined area or larger. The determination is performed because, in a case where the in-focus region has the predetermined area or smaller, the in-focus region is small so that the focal length cannot be calculated or, if calculated, a result is low in accuracy. In the in-focus region determination processing, for example, each of the pyramid images is divided into many regions. It is then determined whether each region is an in-focus region or a not-in-focus region. If a predetermined number or more of the in-focus regions exist, it can be determined that the in-focus region has the predetermined area or larger.

Figure 6A:
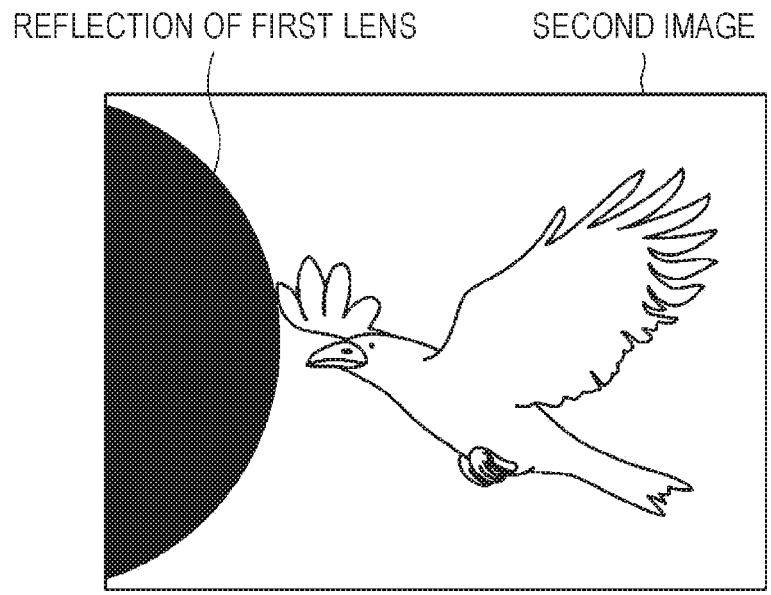
FIGS. 6A and 6B are views for explaining a reflection of a lens.

Next, in step S23, reflection determination for the first lens 100 in the second image is performed. The reflection of the first lens 100 in the second image is as illustrated in FIG. 6A, where the first lens 100 appears as a black region if the first lens 100 is reflected in the second image. This black region is defined as a reflection region. The first lens 100 is not reflected in the first image so that, if the area of the reflection region in the second image is too large, the focal length cannot be calculated or, if calculated, a result is low in accuracy.

Figure 6B:
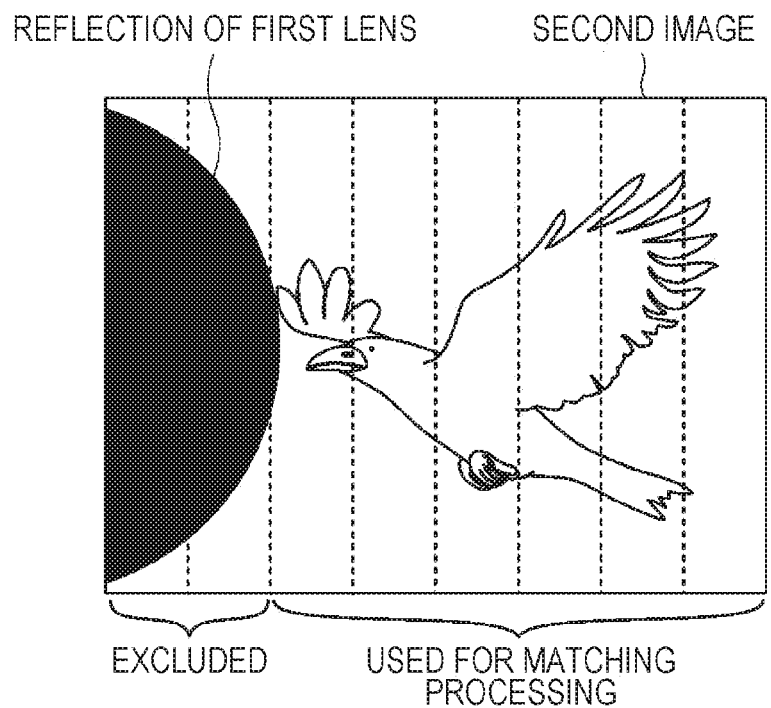

The reflection determination can be performed by a method illustrated in FIG. 6B. First, the second image is divided into a plurality of rectangular regions with a constant width (the divided regions will be referred to as rectangles). Next, for each rectangle, a ratio of the reflection region in the rectangle is calculated. Then, in a case where a predetermined number or more of the rectangles have the reflection region with the ratio exceeding a predetermined amount, it is determined that the reflection of the first lens 100 in the second image is large and that the image cannot be used for calculating the focal length. In this case, a user is notified that imaging is to be performed again.

On the other hand, in a case where a predetermined number or less of the rectangles have the reflection region with the ratio exceeding the predetermined amount, the rectangle with the ratio of the reflection region exceeding the predetermined amount is excluded as illustrated in FIG. 6B, whereby the matching processing is performed using only the rectangles with the ratio of the reflection region therein not exceeding the predetermined amount.

Figure 7:
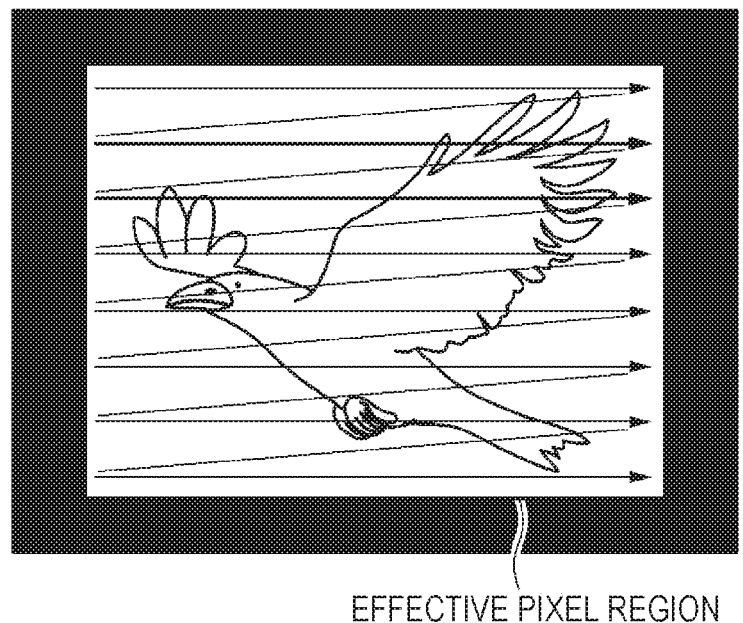
FIG. 7 is an explanatory view of SAD value calculation.
Figure 7:
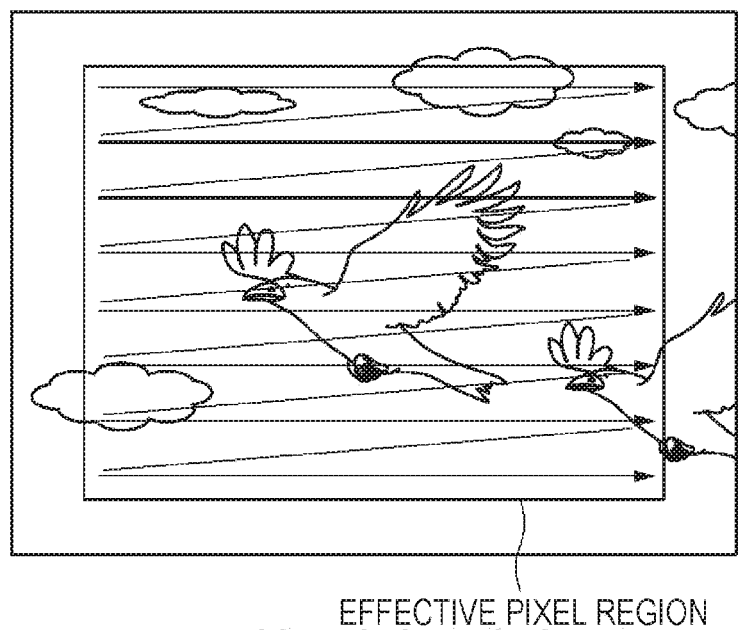

Next, in step S24, the SAD value is calculated for each of the plurality of the pyramid images. The SAD value is calculated using the following expression (2) by comparing each of the pyramid images with the second image block by block within an effective pixel region, as illustrated in FIG. 7.

$$R_{SAD} = \sum_{j=0}^{N-1}\sum_{i=0}^{M-1} |I(i, j) - T(i, j)|$$    [Expression 2]

Next, in step S25, the SAD value is normalized on the basis of the number of effective pixels and the number of effective rectangles in the reflection determination. Next, in step S26, it is determined whether the increments of magnification in the creation of the pyramid images need to be changed to a smaller value. The SAD value decreases as the accuracy of matching between the pyramid image and the second image increases, whereby the increments of magnification in the creation of the pyramid images is changed to a smaller value in order to calculate a more specific SAD value and increase the matching accuracy.

Figure 8:
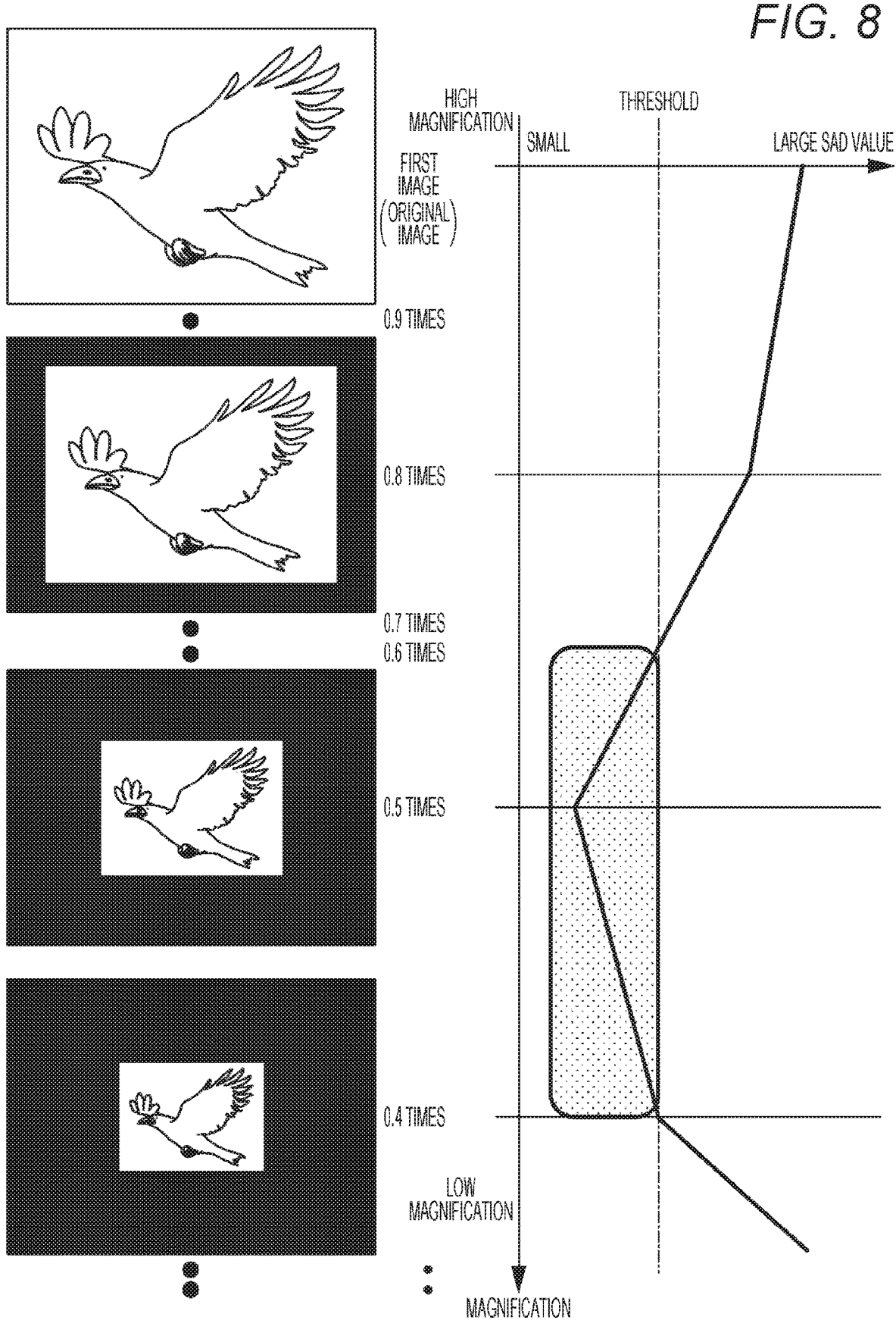
FIG. 8 is a diagram for explaining a change of magnification in creation of the pyramid images.

As illustrated in FIG. 8, whether or not the increments of magnification need to be changed to a smaller value is determined by setting a predetermined threshold for the SAD value and determining whether or not the SAD value is less than or equal to the threshold. In a case where the SAD value is larger than or equal to the predetermined threshold, the processing proceeds to step S27 determining that the increments of magnification of the pyramid images do not need to be changed to a smaller value (No in step S26). The threshold may be set in advance, or may be able to be set by a user for adjusting the matching accuracy.

Then in step S27, sorting is performed on all the SAD values each calculated for each pyramid image, and in step S28, information indicating the minimum SAD value and the magnification of the pyramid image corresponding to the minimum SAD value is output. The minimum SAD value and the magnification of the pyramid image corresponding thereto are used to calculate the focal length in step S16 of the flowchart in FIG. 2.

Here, the description returns to step S26. In a case where the SAD value is smaller than or equal to the predetermined threshold in step S26, the processing proceeds to step S29 determining that the increments of magnification of the pyramid images need to be changed to a smaller value (Yes in step S26). Then, in step S29, a plurality of pyramid images is created in smaller increments of magnification. As described above, the pyramid images created in step S13 of the flowchart in FIG. 2 are a plurality of images obtained by enlarging or reducing the first image while changing the magnification by 0.1. In the case where the increments of the magnification need to be a smaller value, for example, a plurality of pyramid images is created while changing the magnification by 0.01.

The change in the increments of magnification of the pyramid images will be described with reference to FIGS. 8 and 9. The SAD value is calculated for each pyramid image, and in the range where the SAD value is smaller than or equal to the predetermined threshold, the plurality of pyramid images is created in smaller increments of magnification to calculate the SAD values. The range where the SAD value is smaller than or equal to the threshold occurs around the magnification with the highest level of match between the pyramid image and the second image, whereby the matching accuracy can be increased by further reducing the increments of magnification of the pyramid images in that range.

Figure 9:
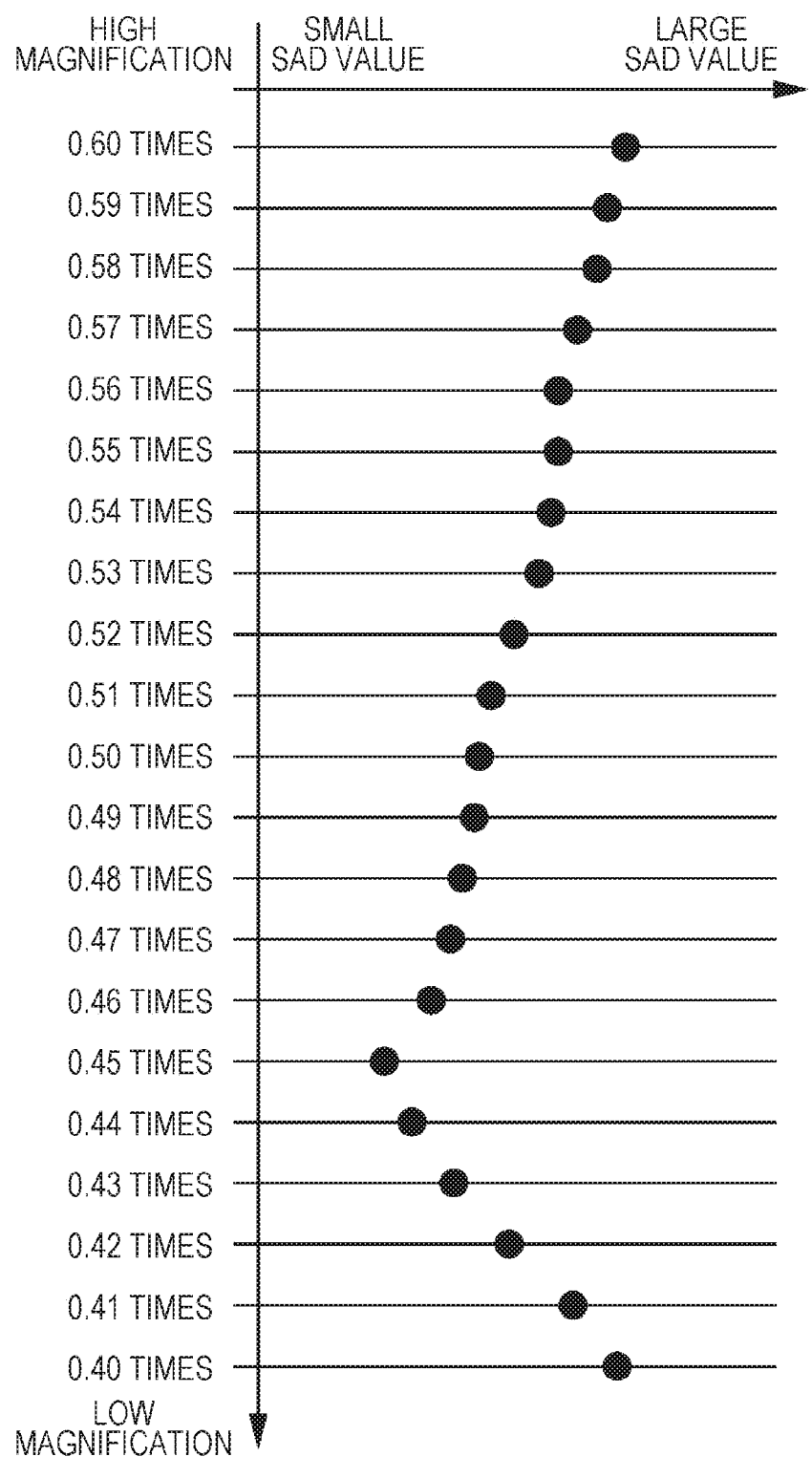
FIG. 9 is a diagram for explaining a change of magnification in creation of the pyramid images.

In the example of FIG. 8, the range in which the SAD value exceeds the threshold is a range with the magnification of 0.6 to 0.4 (a hatched range), so that pyramid images are created with the magnifications in 0.01 increments in the range of 0.6 to 0.4, as illustrated in FIG. 9. Then, the SAD values are calculated also for those pyramid images, and the focal length of the first lens 100 is calculated using the magnification of the pyramid image having the smallest SAD value.

In the example of FIG. 9, the SAD value is the smallest at the magnification of 0.45 so that, in a case where the focal length of the second lens 200 is 20 mm, the above expression (1) is used to calculate the focal length F1 of the first lens 100 as "F1=20/0.45=44.44 mm" from the magnification of 0.45 and the focal length of 20 mm of the second lens 200.

Next, there will be described the determination of whether the result of the matching processing in step S15 of the flowchart of FIG. 2 has sufficient accuracy to calculate the focal length. The determination can be made by checking whether a predetermined condition is satisfied.

The following conditions can be used as the predetermined condition.

(1) The minimum value of the SAD value is less than or equal to a predetermined value (2) The brightness of the first image is higher than or equal to a predetermined value (3) The ISO sensitivity of the first image is lower than or equal to a predetermined value (4) The motion of the imaging apparatus 500 at the time of imaging is less than or equal to a predetermined amount (5) The first lens 100 and the second lens 200 face the same direction (6) The first lens 100 is not reflected in the second image or, even if reflected, the amount of reflection is smaller than or equal to a predetermined amount (7) The first image is in focus It may be determined that the result of the matching processing does not have sufficient accuracy to calculate the focal length in a case where even one of those conditions is not satisfied, or the determination on the accuracy may be made comprehensively by weighting each condition by priority. Alternatively, it may be determined that the result of the matching processing does not have sufficient accuracy in a case where a predetermined number of those conditions is not satisfied.

The determination about the condition of (1) can be made by comparing the minimum value of the SAD value with the predetermined threshold as described with reference to FIGS. 8 and 9. The determination about the conditions of (2), (3), and (7) can be made by analyzing the first image. The determination about the condition of (4) can be made from a result of detection by the motion sensor 309 included in the imaging apparatus body 300. The determination about the condition of (5) can be made by checking whether the same subject is photographed or the like in a comparison between the first image captured by the first lens 100 and the second image captured by the second lens 200. The determination about (6) can be made by the reflection determination regarding the first lens 100 in the second image as described above with reference to FIGS. 6A and 6B.

The condition of (1) is set because the minimum value of the SAD value decreases in proportion to the matching accuracy and, in a case where the minimum value of the SAD value is not less than or equal to the predetermined value, there is a possibility that the matching is not performed properly in the first place. The condition of (2) is set because the matching cannot be performed accurately if the first image is too dark. The condition of (3) is set because if the ISO sensitivity is too high, a problem such as noise is generated in the image and the matching cannot be performed accurately. The condition of (4) is set because if the motion of the imaging apparatus 500 is too large, the subject in the first image and the second image is blurred and the matching cannot be performed accurately. The condition of (5) is set because, in a case where the first lens 100 and the second lens 200 face different directions, different subjects are to be imaged and the matching cannot be performed. The condition of (6) is set because even if the first lens 100 of the second image is reflected, the first lens 100 is not reflected in the first image so that the matching cannot be performed accurately. The condition of (7) is set because in a case where the first image is not in focus, the subject is blurred and the matching cannot be performed accurately.

In a case where the result of the matching processing does not have sufficient accuracy to calculate the focal length, the processing proceeds to step S12, and the imaging apparatus 500 captures the first image and the second image again as captured images upon receiving an imaging instruction such as depression of the release button from a user. This processing is repeated until it is determined in step S15 that the result of the matching processing has sufficient accuracy to calculate the focal length.

Note that in the case where the processing proceeds from step S15 to step S12, the user may be notified that imaging needs to be performed again. This notification can be realized by, for example, displaying a predetermined message or mark on the display unit 307 of the imaging apparatus 500. Alternatively, in addition to the display on the display unit 307, this notification can be realized by a method such as turning on a light included in the imaging apparatus 500, outputting a predetermined message as sound from a speaker included in the imaging apparatus 500, vibrating the imaging apparatus 500 itself, or the like. The notification may be performed using these methods individually or in combination.

As described above, the focal length of the first lens 100 is calculated in the first embodiment. After calculating the focal length in the provisional imaging, a user can perform the main imaging using the focal length information calculated.

According to the first embodiment, the focal length of the first lens 100 can be calculated from the first image captured by the first lens 100 and the second image captured by the second lens 200. As a result, processing using the focal length can be executed even in a case where imaging is performed by mounting a lens with an unknown focal length on the imaging apparatus body 300. For example, even if a lens with an unknown focal length is used, the processing of the imaging apparatus 500 that uses the focal length of a lens such as camera shake correction can be executed. In addition to the camera shake correction, the calculated focal length can be used for any processing of the imaging apparatus 500 that uses the focal length of a lens. Moreover, in a case of using an interchangeable lens that has focal length information in advance as the tag information but does not have a function of transmitting the information to the imaging apparatus body 300, a user does not need to input the focal length information directly to the imaging apparatus 500. Furthermore, the focal length information can be added as Exif information to an image captured by the imaging apparatus 500. Moreover, two images simultaneously captured by different lenses are used, whereby a subject of the provisional imaging for calculating the focal length is not limited to a stationary object.

2. Second Embodiment

[2-1. Focal Length Calculation Processing]

Next, a second embodiment of the present technology will be described. In the second embodiment, the focal length of the first lens 100 is calculated in shooting of a moving image. The configuration of the imaging apparatus 500 including the first lens 100, the second lens 200, the imaging apparatus body 300, and the image processing unit 400 is similar to that of the first embodiment, and thus the description thereof will be omitted.

Figure 10:
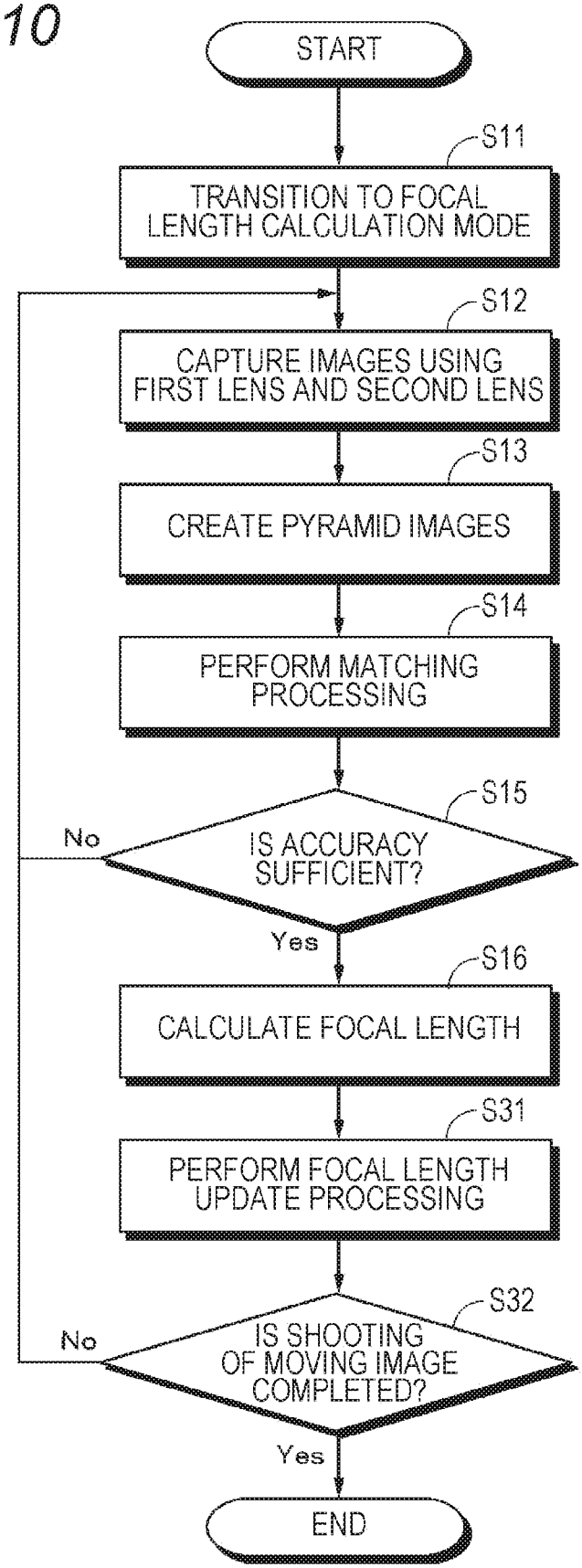
FIG. 10 is a flowchart illustrating a flow of focal length calculation processing according to a second embodiment.

FIG. 10 is a flowchart illustrating a flow of focal length calculation processing according to the second embodiment. The flow from step S11 to step S16 is similar to that of the first embodiment, and thus the description thereof will be omitted. Note that the images captured by the first lens 100 and the second lens 200 in step S12 are frame images making up a moving image. The processing from step S13 to step S16 is performed on the frame images.

After the focal length of the first lens 100 is calculated in step S16, focal length update processing is performed in step S31. In the focal length update processing, first, focal lengths for a total of ten frames from a first frame to a tenth frame making up the moving image are stored, and an average of the focal lengths is calculated. This average focal length is taken as the focal length of the first lens 100.

Next, in step S32, it is determined whether or not shooting of the moving image is completed. Whether or not shooting of the moving image is completed can be determined by whether or not a user has made an input to stop shooting of the moving image or the like. In a case where shooting of the moving image is not completed, the processing proceeds to step S12, and frame images making up the moving image are acquired (No in step S32).

Next, once the focal length of an eleventh frame is calculated in step S16, an average focal length for the next ten frames (from the second frame to the eleventh frame) is calculated again in step S31. This average focal length is then taken as the focal length of the first lens 100.

Next, once the focal length of a twelfth frame is calculated in step S16, an average focal length for the next ten frames (from the third frame to the twelfth frame) is calculated again in step S31. This average focal length is then taken as the focal length of the first lens 100.

The processing is ended in a case where shooting of the moving image is completed in step S32 (Yes in step S32).

As described above, every time the focal length for each frame is calculated, the average focal length for a certain number of frames is always calculated and set as the focal length of the first lens 100, whereby the focal length is updated. Thus, the focal length of the first lens 100 can continue to be updated to the latest information constantly in accordance with the progress of shooting of the moving image.

However, in a case where the calculated focal length of one frame is significantly different from the latest average focal length, the significantly different focal length may be excluded from the calculation of the average focal length. In this case, the average focal length may be calculated from a total of nine focal lengths excluding the significantly different focal length, or from a total of ten focal lengths by excluding the significantly different focal length and adding a new focal length. Whether or not the calculated focal length of one frame is significantly different from the average focal length can be determined by setting a threshold for the average focal length and seeing whether or not the focal length exceeds the threshold.

Note that although the average focal length is calculated from the focal lengths of ten frames in the above description, the number of frames used to calculate the average focal length is not limited to ten but may be ten or more frames or ten or fewer frames.

The second embodiment of the present technology calculates the focal length as described above. According to the second embodiment, even when a moving image is shot using a lens with an unknown focal length as the first lens 100, the focal length of the first lens 100 can be calculated and updated in accordance with the progress of shooting of the moving image. As a result, the processing of the imaging apparatus 500 that uses the focal length of a lens such as camera shake correction can be executed. In addition to the camera shake correction, the calculated focal length can be used for any processing of the imaging apparatus 500 that uses the focal length of a lens.

3. User Interface

Figure 11:
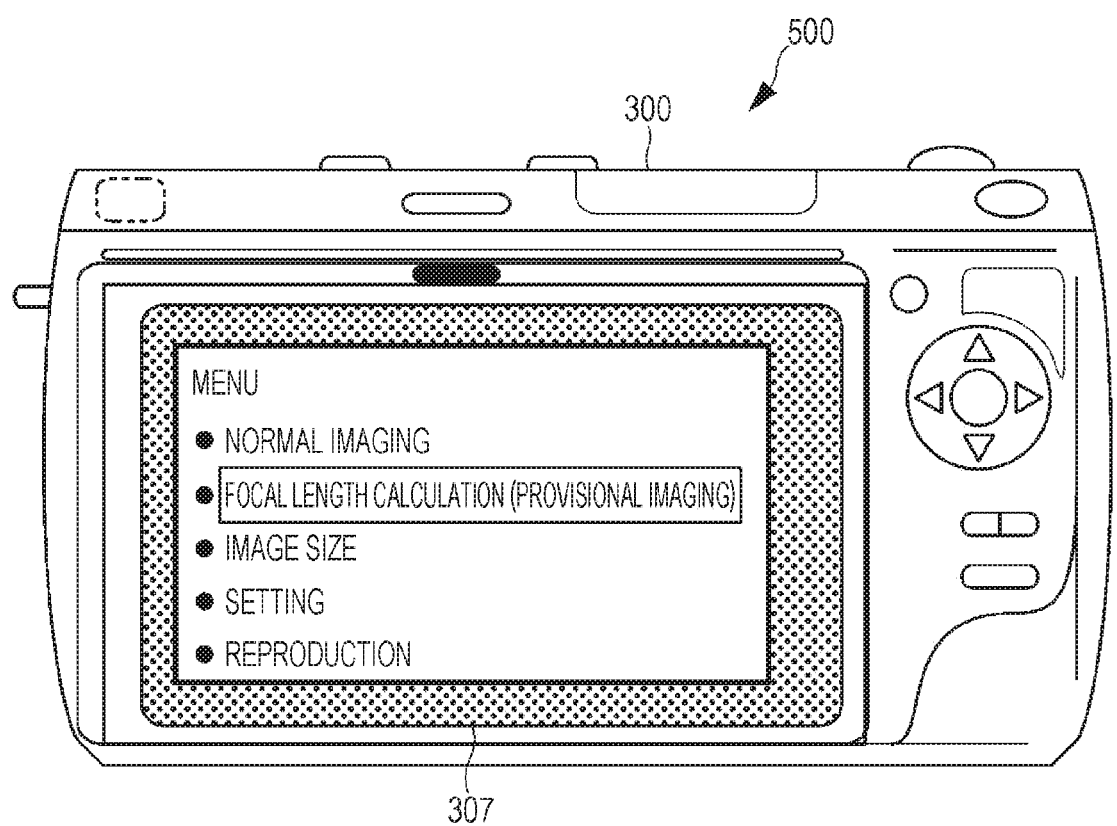
FIG. 11 is a view illustrating an example of a user interface.

Next, an example of a user interface for a user to use the focal length calculation processing will be described. FIG. 11 is a view illustrating an example of the user interface.

In the example of the user interface illustrated in FIG. 11, a character string as an icon for instructing transition to a mode that performs focal length calculation is arranged on a menu screen displayed on the display unit 307 of the imaging apparatus 500. When a user performs an input on the icon, the imaging apparatus 500 transitions to a provisional imaging mode for calculating the focal length. Note that the menu screen of FIG. 11 is merely an example, and thus the configuration of the menu screen is not limited to the example of FIG. 11.

Alternatively, a hardware button for transitioning to the provisional imaging mode that calculates the focal length may be provided on the imaging apparatus 500 to allow it to transition to the provisional imaging mode when the hardware button is pressed.

Moreover, a mechanical switch for detecting mounting of the first lens 100 on the imaging apparatus body 300 may be provided in the imaging apparatus body 300 to allow for transition to the provisional imaging mode for calculating the focal length automatically when mounting of the first lens 100 is detected.

Furthermore, in a case where a reset instruction input is made by a user after the focal length of the first lens 100 is calculated and used by the user to perform the main imaging, the focal length of the first lens 100 may be reset (initialized). Alternatively, a timing function included in the imaging apparatus 500 may be used to automatically reset the focal length when a predetermined time (for example, one day) has elapsed from the execution of the focal length calculation. Moreover, after the focal length is calculated in the provisional imaging mode, the calculated focal length may be reset the next time the apparatus transitions to the provisional imaging mode for calculating the focal length.

4. Variation

Although the embodiments of the present technology have been described in detail above, the present technology is not limited to the above embodiments but can be modified in various ways based on the technical idea of the present technology.

The present technology can be applied not just to the single-lens reflex camera but to a digital video camera, a digital camera, or the like as long as a separate lens can be mounted on the camera. Furthermore, the present technology can be applied to a device other than the camera such as a smartphone, a mobile phone, a portable game machine, an in-vehicle camera, a surveillance camera, a laptop computer, a tablet terminal, a wristwatch-type wearable terminal, a glasses-type wearable terminal, or the like as long as a separate lens can be mounted on the device.

The first lens 100 is not limited to the so-called interchangeable lens for single-lens reflex cameras but may be a so-called lens-style camera that includes a lens and an imaging element to transmit and receive image data to and from an external device by wireless communication. The second lens 200 may also be a lens-style camera.

The second lens 200 is not limited to the one built in the imaging apparatus body 300, but may be one that is mechanically mounted on the imaging apparatus body 300 using the mount 150 or the like or a lens that is connected to the imaging apparatus body 300 by a communication system such as Bluetooth or Wi-Fi to be able to transmit and receive data to and from the imaging apparatus body 300.

The embodiment describes that both enlargement and reduction are performed to create the pyramid images. However, the pyramid images may be created in accordance with whether the first lens 100 and the second lens 200 are each a telephoto lens; that is, the pyramid images may be created by reducing the first image in a case where the first lens 100 is a telephoto lens, or may be created by enlarging the first image in a case where the second lens 200 is a telephoto lens.

In the embodiment, the image signal acquired by the first lens 100 and the first imaging element 302 and the image signal acquired by the second lens 200 and the second imaging element 303 are processed by the single camera processing circuit 304, but may be processed by separate camera processing circuits and supplied to the image processing unit 400 that calculates the focal length.

In a case where the first lens 100 and the second lens 200 are not parallel and the parallax is large, the matching accuracy is possibly reduced due to the angles of view of the first image and the second image being too different from each other. In order to avoid that, there may be adopted a method that extracts corresponding points from the two images being the first and second images, calculates a projective transformation matrix, matches the angle of view of one of the images with the angle of view of the other, and then performs matching based on the SAD value again. The matching can thus be performed with high accuracy even if the angles of view of the two lenses are different.

Figure 12:
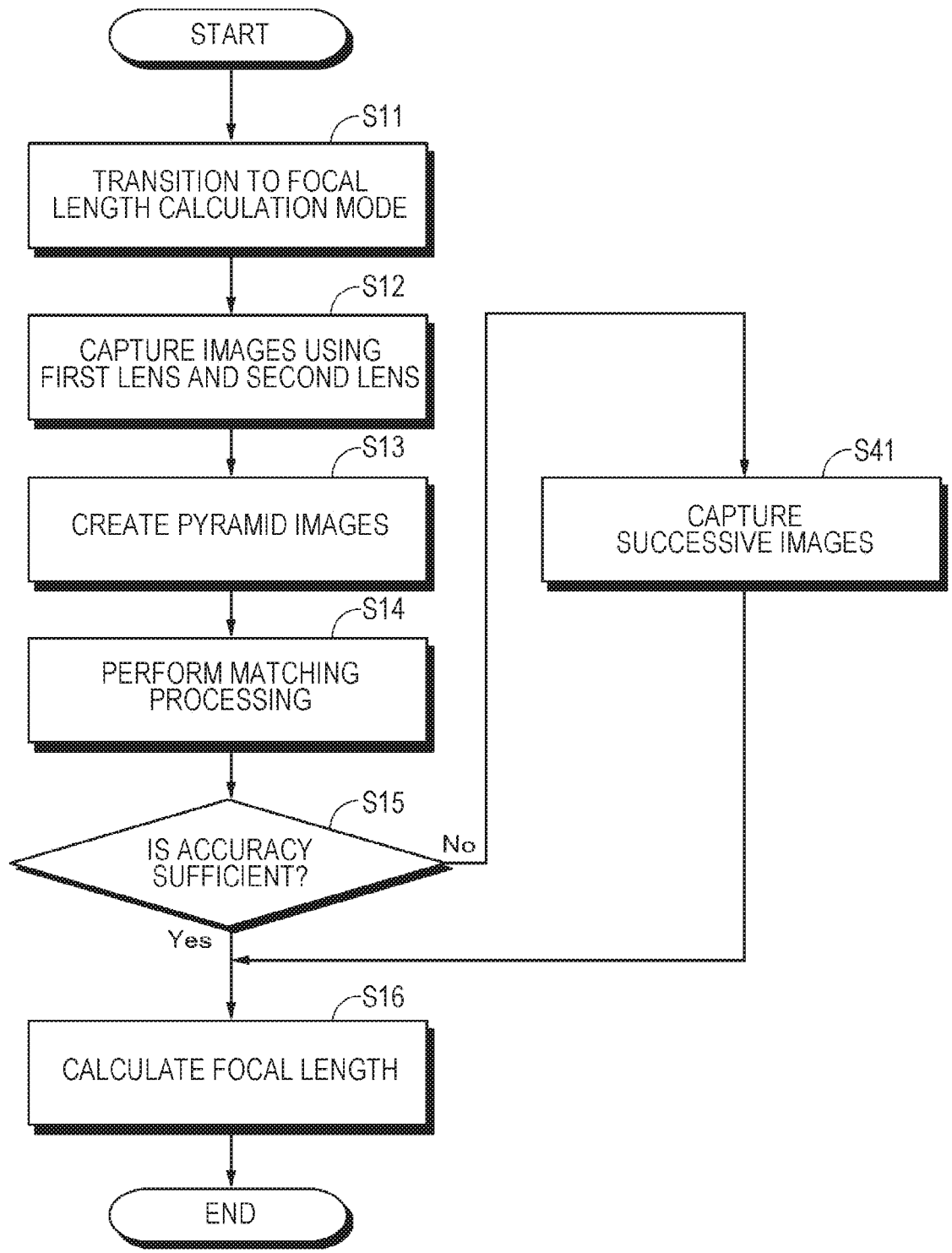
FIG. 12 is a flowchart illustrating a flow of focal length calculation processing according to a variation.

As illustrated in a flowchart of FIG. 12, in a case where it is determined in step S15 that a result of the matching processing does not have sufficient accuracy to calculate the focal length, the processing proceeds to step S41 and may acquire two of the first images successively by the first lens 100 and calculate the focal length from the successive images (No in step S15). As a method of calculating the focal length from the two successive images, methods described in Japanese Patent Application Nos. 2004-315927 and 2006-129173 can be adopted, for example.

In the embodiment, the pyramid images are first created with the magnifications in 0.1 increments and further created with the magnifications in 0.01 increments, but may be created with the magnifications in 0.01 increments from the beginning. Furthermore, the increments of magnification are not limited to 0.1 times, 0.01 times, and the like but may be any value such as 0.2 times, 0.05 times, or the like.

Furthermore, the first lens 100 may be an optical system having a plurality of lenses in which a converter lens (conversion lens) with an unknown magnification is mounted on a lens (master lens) with a known focal length. The converter lens is one that is mounted on the master lens at the time of imaging with a camera to enable imaging on the wide angle side or the telephoto side relative to the original focal length of the optical system. This corresponds to, for example, a case where the converter lens is mounted at the tip of a lens integrated with a camera body, or a case where the converter lens is installed on a mount connecting a camera body and an interchangeable lens. This also corresponds to a case where the converter lens is mounted on one of two cameras included in a smartphone, for example.

The present technology can also be embodied in the following configurations.

(1)

An image processing device that uses a first image captured by a first lens with an unknown focal length and a second image captured by a second lens with a known focal length to calculate the focal length of the first lens.

(2)

The image processing device according to (1), in which the first image and the second image are images captured at the same timing to include the same subject.

(3)

The image processing device according to (1) or (2) that performs matching processing between a plurality of pyramid images obtained by enlarging and/or reducing the first image by a plurality of magnifications changed with a first increment and the second image, and calculates the focal length of the first lens from the magnification of an image with the highest level of match among the plurality of pyramid images and the focal length of the second lens.

(4)

The image processing device according to (3) that calculates an SAD value for each of the plurality of pyramid images from each of the plurality of pyramid images and the second image, and determines the pyramid image with the smallest value of the SAD value as the image with the highest level of match.

(5)

The image processing device according to (4) that, in a case where the SAD value is smaller than or equal to a predetermined value, performs matching processing between a plurality of pyramid images obtained by enlarging and/or reducing the first image by a plurality of magnifications changed with a second increment smaller than the first increment and the second image in a range in which the SAD value is smaller than or equal to the predetermined value, and calculates the focal length of the first lens from the magnification of an image with the highest level of match among the plurality of pyramid images and the focal length of the second lens.

(6)

The image processing device according to any one of (3) to (5) that determines accuracy of the matching processing on the basis of whether or not a result of the matching processing satisfies a predetermined condition.

(7)

The image processing device according to (6), in which the predetermined condition is that the first lens and the second lens face the same direction.

(8)

The image processing device according to (6) or (7), in which the predetermined condition is that brightness of the first image is higher than or equal to a predetermined value.

(9)

The image processing device according to any one of (6) to (8), in which the predetermined condition is that ISO sensitivity of the first image is lower than or equal to a predetermined value.

(10)

The image processing device according to any one of (6) to (9, in which the predetermined condition is that the first lens is not reflected in the second image or that an area of reflection of the first lens in the second image is smaller than or equal to a predetermined size.

(11)

The image processing device according to (10) that performs the matching using a region in which the first lens is not reflected in the second image in a case where the size of the area of reflection of the first lens in the second image is smaller than or equal to the predetermined size.

(12)

The image processing device according to any one of (6) to (11), in which the predetermined condition is that the first image is in focus.

(13)

The image processing device according to any one of (1) to (12), in which the first image is a frame image making up a moving image.

(14)

The image processing device according to (13) that calculates the focal length for each of a plurality of the frame images, and sets an average of the focal lengths of a predetermined number of the frame images as the focal length of the first lens.

(15)

The image processing device according to (14), in which the focal length of the frame image being calculated is excluded from calculation of an average next time in a case where a difference between the focal length of the frame image being calculated and the latest value of the average calculated using the frame images immediately preceding the frame image is larger than or equal to a predetermined amount.

(16)

The image processing device according to any one of (1) to (15), in which the first lens is an interchangeable lens that can be mounted on an imaging apparatus, and the second lens is a lens that is provided integrally with the imaging apparatus.

(17)

The image processing device according to any one of (1) to (16), in which the first lens is a lens in which a converter with an unknown magnification is mounted on a lens with a known focal length.

(18)

The image processing device according to any one of (1) to (17) that has a mode for calculating the focal length of the first lens, and transitions to the mode with an input from a user or mounting of the first lens on the imaging apparatus as a trigger.

(19)

An image processing method that uses a first image captured by a first lens with an unknown focal length and a second image captured by a second lens with a known focal length to calculate the focal length of the first lens.

(20)

An image processing program that causes a computer to execute an image processing method that uses a first image captured by a first lens with an unknown focal length and a second image captured by a second lens with a known focal length to calculate the focal length of the first lens.

REFERENCE SIGNS LIST

100 First lens
200 Second lens
400 Image processing unit

The invention claimed is:

1. An image processing device, comprising:
a central processing unit (CPU) configured to:
receive a first image captured by a first lens, and a second image captured by a second lens with a first specific focal length;
generate a first pyramid image based on one of enlargement or reduction of the first image captured by the first lens; and
calculate a focal length of the first lens based on the second image captured by the second lens with the first specific focal length, and the first pyramid image.

2. The image processing device according to claim 1, wherein
the capture of the first image by the first lens and the capture of the second image by the second lens are at a same time, and
the first image by the first lens and the second image by the second lens include a same subject.

3. The image processing device according to claim 1, wherein the CPU is further configured to:
generate a first plurality of pyramid images with a first plurality of magnification values, wherein
the first plurality of pyramid images is generated by at least one of the enlargement or the reduction of the first image captured by the first lens,
the at least one of the enlargement or the reduction of the first image is by the first plurality of magnification values,
the first plurality of magnification values is changed in first increments,
each pyramid image of the first plurality of pyramid images corresponds to a respective magnification value of the first plurality of magnification values, and
the first plurality of pyramid images includes the first pyramid image;
execute a matching process between the second image and each pyramid image of the first plurality of pyramid images; and
calculate the focal length of the first lens based on a magnification value, of the first plurality of magnification values, of the first pyramid image and the first specific focal length of the second lens, wherein the first pyramid image has a highest match level with the second image, among the first plurality of pyramid images.

4. The image processing device according to claim 3, wherein the CPU is further configured to:
calculate a sum of absolute difference (SAD) value for each pyramid image of the first plurality of pyramid images based on the matching process between the second image and the each pyramid image of the first plurality of pyramid images; and
determine the first pyramid image has the highest match level based on the SAD value of the first pyramid image that is smallest among the first plurality of pyramid images.

5. The image processing device according to claim 4, wherein the CPU is further configured to:
generate a second plurality of pyramid images, with a second plurality of magnification values, based on the SAD value of the first pyramid image that is one of smaller than or equal to a threshold value, wherein
the second plurality of pyramid images is generated by at least one of the enlargement or the reduction of the first image captured by the first lens,
the at least one of the enlargement or the reduction of the first image is by the second plurality of magnification values, and
the second plurality of magnification values is changed in second increments smaller than the first increments,
execute the matching process between the second image and each pyramid image of the second plurality of pyramid images; and
calculate the focal length of the first lens based on a magnification value of the second plurality of magnification values of a second pyramid image of the second plurality of pyramid images, and the first specific focal length of the second lens,
wherein the second pyramid image has a highest match level, with the second image captured by the second lens, among the second plurality of pyramid images.

6. The image processing device according to claim 3, wherein the CPU is further configured to determine accuracy information of the matching process based on a result of the matching process that satisfies a specific condition.

7. The image processing device according to claim 6, wherein the specific condition is that the first lens and the second lens face a same direction.

8. The image processing device according to claim 6, wherein the specific condition is that brightness of the first image captured by the first lens is one of higher than or equal to a specific value.

9. The image processing device according to claim 6, wherein the specific condition is that ISO sensitivity of the first image captured by the first lens is one of lower than or equal to a specific value.

10. The image processing device according to claim 6, wherein the specific condition corresponds to one of absence of reflection of the first lens in the second image or an area of the reflection of the first lens in the second image that is one of smaller than or equal to a specific size.

11. The image processing device according to claim 10, wherein
the CPU is further configured to execute the matching process based on
a region of the second image in which the reflection of the first lens is absent, and
a size of the area of the reflection of the first lens in the second image that is one of smaller than or equal to the specific size.

12. The image processing device according to claim 6, wherein the specific condition is that the first image captured by the first lens is in focus.

13. The image processing device according to claim 1, wherein the first image is a first frame image of a plurality of frame images of a moving image.

14. The image processing device according to claim 13, wherein the CPU is further configured to:
calculate a plurality of focal lengths for the plurality of frame images, wherein each frame image of the plurality of frame images corresponds to a respective focal length of the plurality of focal lengths;
calculate a first average value of a first set of focal lengths of the plurality of focal lengths; and
set the first average value as the focal length of the first lens, wherein each focal length of the first set of focal lengths corresponds to a respective frame image of a first number of frame images of the plurality of frame images.

15. The image processing device according to claim 14, wherein
the CPU is further configured to calculate a second average value of a second set of focal lengths of the plurality of focal lengths without utilization of the focal length of a second frame image of the plurality of frame images,
each focal length of the second set of focal lengths corresponds to a respective frame image of a second number of frame images of the plurality of frame images,
the second average value of the second set of focal lengths is calculated without utilization of the focal length of the second frame image based on a difference between the focal length of the second frame image and the first average value,
the difference is one of larger than or equal to a specific amount,
the second frame image is subsequent to the first number of frame images, and
the calculation of the second average value is subsequent to the calculation of first average value.

16. The image processing device according to claim 1, wherein
the first lens is an interchangeable lens mountable on an imaging apparatus, and
the second lens is integral to the imaging apparatus.

17. The image processing device according to claim 1, wherein the first lens includes a converter mountable on a specific lens with a second specific focal length.

18. The image processing device according to claim 1, wherein
the CPU is further configured to transition to a mode for the calculation of the focal length of the first lens, and
the transition to the mode is based on at least one of a user input or a mounting operation of the first lens on an imaging apparatus as a trigger.

19. The image processing device according to claim 1, wherein the CPU is further configured to:
generate a plurality of pyramid images with a plurality of magnification values, wherein
the plurality of pyramid images is generated by at least one of the enlargement or the reduction of the first image captured by the first lens, the at least one of the enlargement or the reduction of the first image is by the plurality of magnification values, the plurality of magnification values is changed in specific increments, and each pyramid image of the plurality of pyramid images corresponds to a respective magnification value of the plurality of magnification values; and select the first pyramid image from the plurality of pyramid images.

20. The image processing device according to claim 1, wherein the CPU is further configured to:

generate a plurality of pyramid images with a plurality of magnification values, wherein the plurality of pyramid images is generated by at least one of the enlargement or the reduction of the first image captured by the first lens, the at least one of the enlargement or the reduction of the first image is by the plurality of magnification values, the plurality of magnification values is changed in specific increments, and each pyramid image of the plurality of pyramid images corresponds to a respective magnification value of the plurality of magnification values;

execute a matching process between the second image and each pyramid image of the plurality of pyramid images; and select the first pyramid image from the plurality of pyramid images based on the execution of the matching process.

21. The image processing device according to claim 20, wherein the first pyramid image has a highest match level with the second image, among the plurality of pyramid images.

22. The image processing device according to claim 1, wherein the CPU is further configured to generate a plurality of pyramid images corresponding to the first image captured by the first lens, the plurality of pyramid images includes the first pyramid image, and the first pyramid image has a highest match level with the second image, among the plurality of pyramid images.

23. An image processing method, comprising:

receiving a first image captured by a first lens, and a second image captured by a second lens with a specific focal length;

generating a pyramid image based on one of enlargement or reduction of the first image captured by the first lens; and calculating a focal length of the first lens based on the second image captured by the second lens with the specific focal length, and the pyramid image.

24. A non-transitory computer-readable medium having stored thereon, computer-executable instructions which, when executed by a computer, cause the computer to execute operations, the operations comprising:

receiving a first image captured by a first lens, and a second image captured by a second lens with a specific focal length;

generating a pyramid image based on one of enlargement or reduction of the first image captured by the first lens; and calculating a focal length of the first lens based on the second image captured by the second lens with the specific focal length, and the pyramid image.

* * * * *